US006453293B1

(12) United States Patent
Kämmerer

(10) Patent No.: US 6,453,293 B1
(45) Date of Patent: Sep. 17, 2002

(54) METHOD AND DEVICE FOR RECOGNIZING AT LEAST ONE KEYWORD IN SPOKEN SPEECH USING A COMPUTER

(75) Inventor: Bernhard Kämmerer, Ottobrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/713,475

(22) Filed: Nov. 15, 2000

Related U.S. Application Data

(63) Continuation of application No. PCT/DE99/01322, filed on May 3, 1999.

(30) Foreign Application Priority Data

May 15, 1998 (DE) ........................................ 198 21 900

(51) Int. Cl.$^{7}$ ................................................ G10L 15/10

(52) U.S. Cl. ........................................ 704/254; 704/251

(58) Field of Search ................................ 704/251, 254, 704/256

(56) References Cited

U.S. PATENT DOCUMENTS 5,440,662 A * 8/1995 Sukkar ....................... 704/236

FOREIGN PATENT DOCUMENTS

| DE | 3931638 A1 | 4/1991 |
|---|---|---|
| DE | 19510095 A1 | 9/1996 |

OTHER PUBLICATIONS

Published International Application No. 97/46998 (Glass), dated Dec. 11, 1997.

"A Stochastic Segment Model for Phoneme–Based Continuous Speech Recognition", Mari Ostendorf et al., IEEE on Acoustics, Speech, and Signal Processing 37, Dec. 1989, No. 12, New York, pp. 1857–1869.

"A New Keyword Spotting Algorithm With Pre–calculated Optimal Thresholds", J. Junkawitsch et al., XP–002119160.

"Optimierung von Algorithmen und Entwurf eines Prozessors fuer die automatische Spracherkennung", Chair of Integrated Circuits, Technical University Munich, Dissertation, Jul. 19, 1993, Chapter 2, pp. 13–26.

"Sprachunterricht—Wie funkioniert computerbasierende Spracherkennung?", Nils Haberland et al., c't 1998, Heinz Heise Verlag, Hannover, pp. 120–125.

Richard C. Rose and Douglas B. Paul, "A Hidden Markov Model Based Keyword Recognition System," Proc. IEEE ICASSP 90, vol. 1, pp. 129–132, Apr. 1990.*

Jay G. Wilpon, Lawrence R. Rabiner, Chin–Hui Lee, and E. R. Goldman, "Automatic Recognition of Keywords in Unconstrained Speech Using Hidden Markov Models," IEEE Trans on Acoustics, Speech, and Signal Processing, vol. 38, No. 11, pp. 1870–1878, Nov. 1.*

* cited by examiner

*Primary Examiner*—Tālivaldis Ivars Šmits

(74) *Attorney, Agent, or Firm*—Laurence A. Greenberg; Werner H. Stemer; Gregory L. Mayback

(57) ABSTRACT

In order to recognize a keyword in spoken speech, the keyword is subdivided, just like a test pattern to be recognized, into segments. The individual segments of the keyword and of the test pattern are mapped onto one another and a comparison measurement is made and is accumulated over the segments. The keyword is repeatedly stored in a training phase, a plurality of reference features respectively being determined for each segment of the keyword are stored. During recognition, a reference feature wich best fits the relevant segment of the test pattern is assigned in a segment-wise fashion.

9 Claims, 4 Drawing Sheets

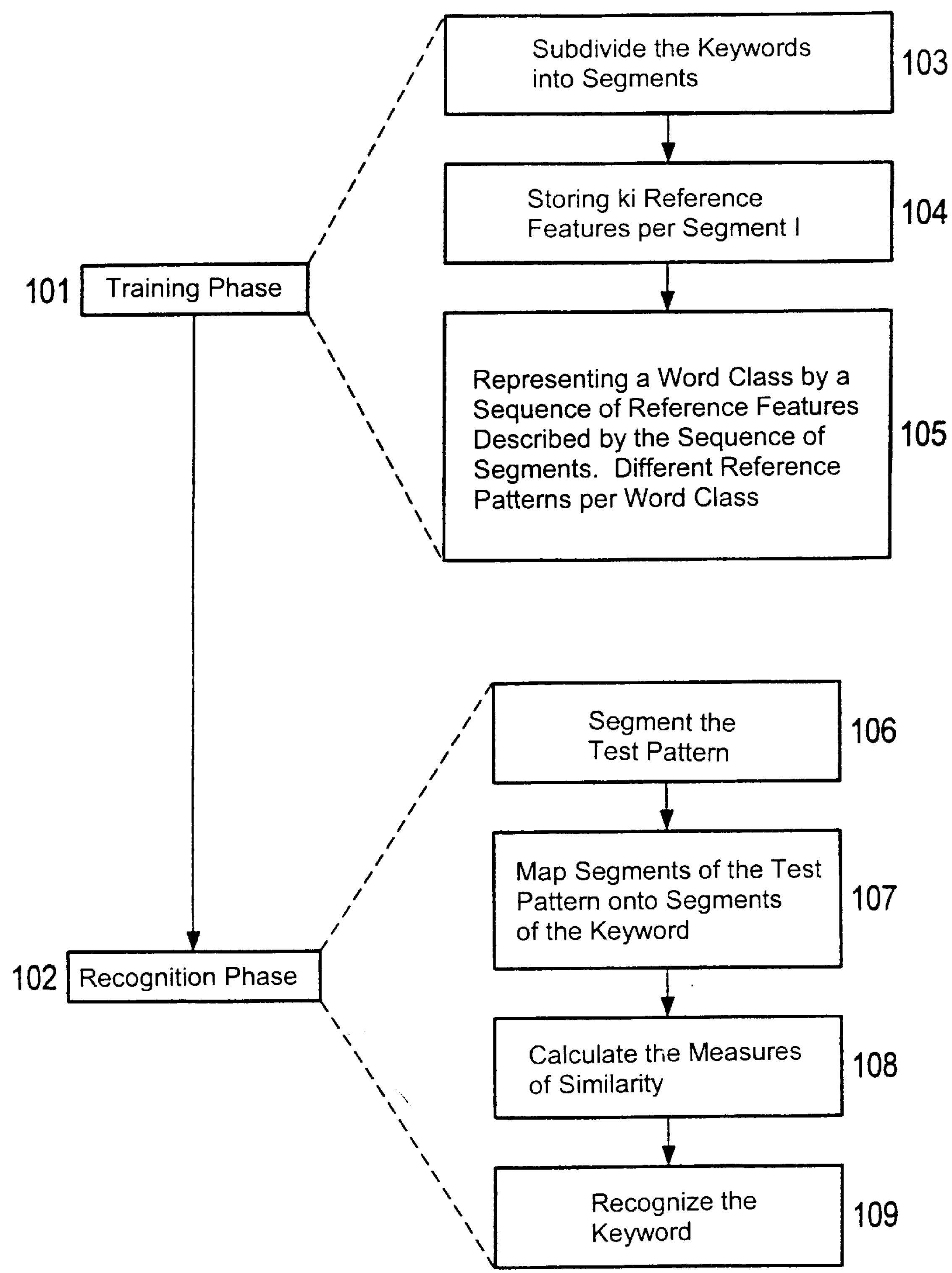
FIG 1
101 Training Phase
Subdivide the Keywords into Segments
103
Storing ki Reference Features per Segment l
104
Representing a Word Class by a Sequence of Reference Features Described by the Sequence of Segments. Different Reference Patterns per Word Class
105
102 Recognition Phase
Segment the Test Pattern
106
Map Segments of the Test Pattern onto Segments of the Keyword
107
Calculate the Measures of Similarity
108
Recognize the Keyword
109

FIG 3
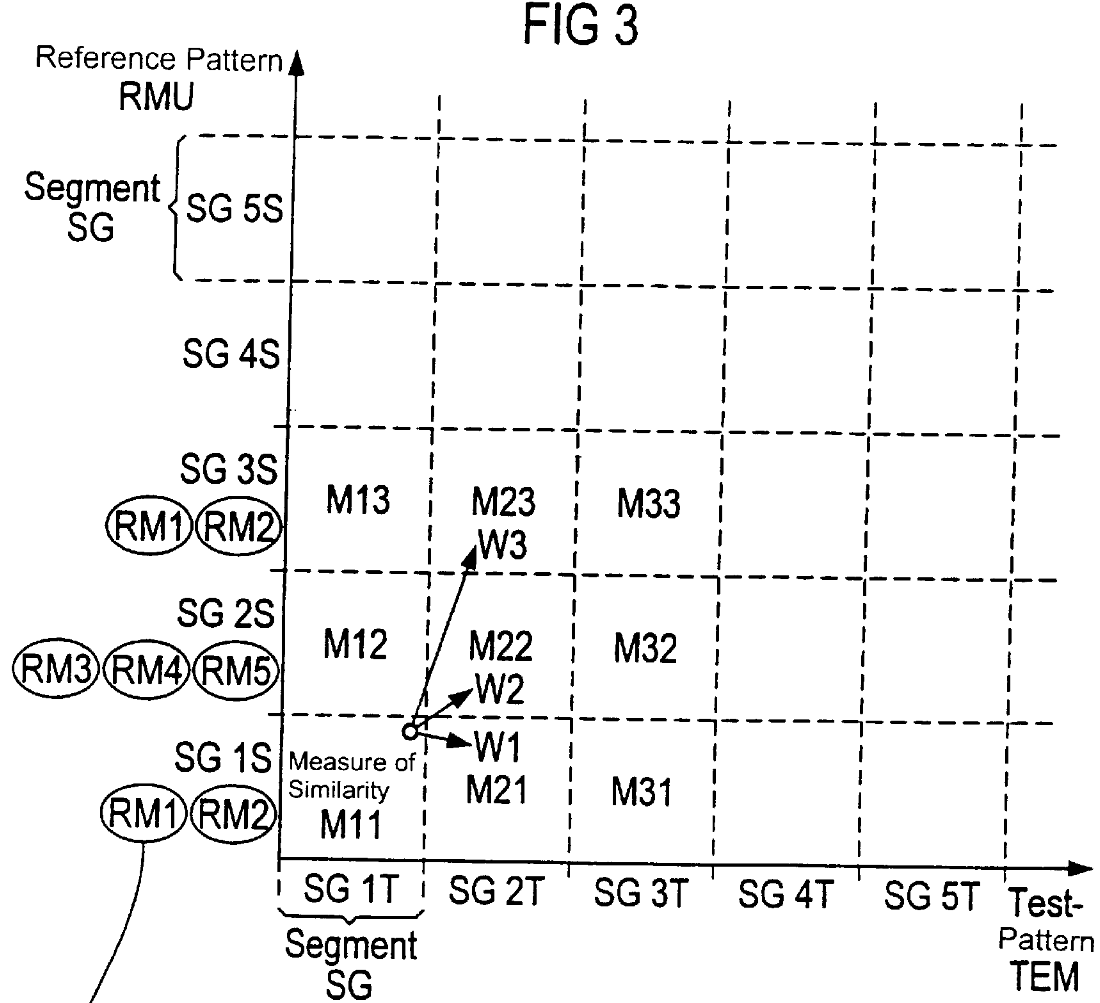
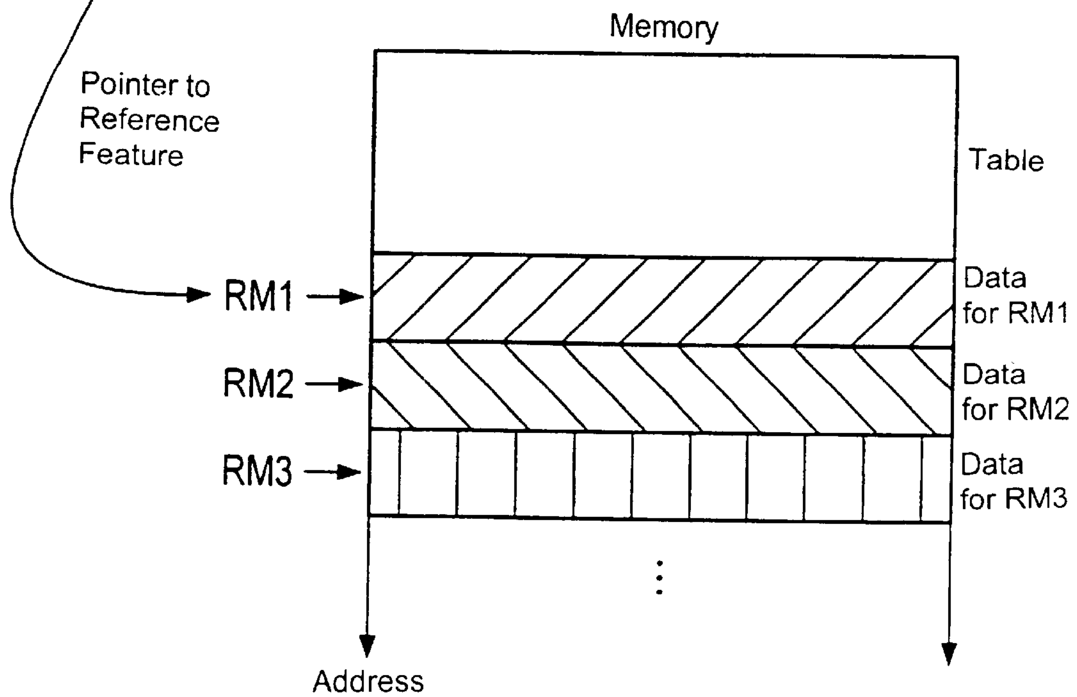

METHOD AND DEVICE FOR RECOGNIZING AT LEAST ONE KEYWORD IN SPOKEN SPEECH USING A COMPUTER

CROSS-REFERENCE TO RELATED APPLICATION

This is a continuation of copending International Application PCT/DE99/01322, filed May 3, 1999, which designated the United States.

BACKGROUND OF THE INVENTION

FIELD OF THE INVENTION

The invention relates to a method and a device for recognizing at least one keyword in spoken speech using a computer.

A method and a device for recognizing spoken speech are known from the reference by A. Hauenstein, titled "Optimierung von Algorithmen und Entwurf eines Prozessors für die automatische Spracherkennung", ["Optimization of Algorithms and Design of a Processor for Automatic Speech Recognition"], Chair of Integrated Circuits, Technical University Munich, Dissertation, 07.19.1993, chapter 2, pages 13 to 26. This publication also contains a basic introduction on components of a device for a method for speech recognition, and also important techniques customary in speech recognition.

A keyword is a specific word that is to be recognized by a device for speech recognition in spoken speech. Such a keyword is mostly linked to a prescribed action, that is to say this action is executed after recognition of the keyword.

A method and a device for recognizing spoken speech are also described in the reference by N. Haberland, et. al., titled "Sprachunterricht—Wie funktioniert die computerbasierte Spracherkennung?", ["Language Instruction—How Does Computer—Based Speech Recognition Work?"], c't May 1998, Heinz Heise Verlag, Hannover 1998, pages 120 to 125. It follows therefrom, inter alia, that modeling by hidden Markov models permits adaptation to a variation in the speed of the speaker, and that in the case of recognition a dynamic adaptation of the prescribed speech modules to the spoken speech is therefore performed, in particular by carrying out compression or expansion of the time axis. This corresponds to a dynamic adaptation (also: dynamic programming) which is insured, for example, by the Viterbi algorithm.

A space between sounds or sound sequences is determined, for example, by determining a (multidimensional) space between feature vectors that describe the sounds of speech in digitized form. This spacing is an example for a measure of similarity between sounds or sound sequences.

SUMMARY OF THE INVENTION

It is accordingly an object of the invention to provide a method and a device for recognizing at least one keyword in spoken speech using a computer which overcome the above-mentioned disadvantages of the prior art methods and devices of this general type, in which the recognition is robust and insensitive to interference.

With the foregoing and other objects in view there is provided, in accordance with the invention, a speech recognition method in which a computer performs the steps of:

a) subdividing a keyword into key segments;

b) assigning each of the key segments a set of reference features;

c) subdividing a test pattern derived for spoken speech into test segments;

d) assigning each of the test segments of the test pattern a reference feature from the set of reference features from a corresponding one of the key segments being most similar to a respective test segment; and e) recognizing the test pattern as the keyword, if a measure of similarity is determined to be below a prescribed value of an accumulated segment-wise comparison of the reference feature to the respective test segment for each of the test segments of the test pattern.

A method is specified for recognizing at least one keyword in spoken speech using a computer, the keyword being subdivided into segments and each segment being assigned a set of reference features. A test pattern which is included in the spoken speech is subdivided into segments, each segment of the test pattern is assigned a reference feature being most similar to the segment, from the set of the reference features for the corresponding segment of the keyword. The test pattern is recognized as a keyword when a measure of similarity for the accumulated segment wise assignment of a reference feature of the keyword relative to the test pattern is below a prescribed bound. The test pattern is not recognized as a keyword if the measure of similarity is not below a prescribed bound. In this case, a low measure of similarity characterizes a good correspondence between the reference feature of the keyword and the test pattern.

A brief account of the various terms and their meaning follows below. The test pattern is a pattern included in the spoken speech which is to be compared with the keyword and is recognized as the keyword, if appropriate. The measure of similarity characterizes the degree of correspondence between a test pattern and the keyword, or between a part of the test pattern and a part of the keyword. The segment is a section of the test pattern or of the keyword which has a prescribed duration. The reference feature is a sub-feature of the keyword which is referenced to a segment. A reference pattern contains the reference features characterizing a form of expression of the keyword. A word class contains all to reference patterns which can be produced by different combinations of reference features, and a plurality of reference features per segment being stored for the keyword, in particular. In a training phase, representatives of reference features of the respective keyword are determined and stored, while in a recognition phase a comparison of the test pattern with possible reference patterns of the keyword is carried out.

In the training phase, a prescribed set M of representatives of the reference features is preferably stored. If more than reference features are available as free spaces M, averaging of the reference features, for example in the form of a sliding average, can be performed in order thereby to take account of the information of the additional reference features in the representatives.

A development of the invention consists in that the test pattern (and/or the keyword) is an independent sound unit, in particular a word. The test pattern and/or the keyword can also be a phonem, a diphone, another sound composed of a plurality of phonems, or a set of words.

Another development consists in that the number of segments for the keyword and for the test pattern is the same in each case.

Within the framework of an additional development, the test pattern is compared with a plurality of keywords, and the keyword most similar to the test pattern is output. This corresponds to a system for recognizing individual words, the plurality of keywords representing the individual words to be recognized in the spoken speech. In each case, the keyword which best fits the test pattern included in the spoken speech is output.

Another development is that feature vectors are used for storing the keyword and the test pattern, in which case at prescribed sampling instances the speech is digitized and one feature vector each is stored with the data characterizing the speech. This digitization of the speech signal takes place within the framework of preprocessing. A feature vector is preferably determined from the speech signal every 10 ms.

Another development consists in that there is stored for each segment a feature vector which is averaged over all the feature vectors of this segment and is further used as a characteristic of this segment. The digitized speech data, which occur every 10 ms, for example, are preferably preprocessed in overlapping time windows with a temporal extent of 25 ms. An LPC analysis, a spectral analysis or a Cepstral analysis can be used for this purpose. A feature vector with n coefficients is available as a result of the respective analysis for each 10 ms section. The feature vectors of a segment are preferably averaged such that one feature vector is available per segment. It is possible within the framework of the training for recognizing the keyword to store a plurality of different reference features per segment from different sources for spoken speech, such that a plurality of averaged reference features (feature vectors for the keyword) are available.

Furthermore, a device is specified for recognizing at least one keyword in spoken speech, which has a processor unit which is set up in such a way that the following steps are carried out. The keyword is subdivided into segments, it being possible to assign each segment a set of reference features. A test pattern in the spoken speech is subdivided into segments, it being possible to assign each segment of the test pattern a reference feature most similar to the segment the test pattern, from the set of reference features for the corresponding segment of the keyword. The test pattern is recognized as a keyword when the measure of similarity for the accumulated segment wise assignment of a reference feature of the keyword relative to the test pattern is below a prescribed bound. If the measure of similarity is not below the prescribed bound, the keyword is not recognized.

Other features which are considered as characteristic for the invention are set forth in the appended claims.

Although the invention is illustrated and described herein as embodied in a method and a device for recognizing at least one keyword in spoken speech using a computer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a flow block diagram illustrating the steps of a method for recognizing at least one keyword in spoken speech;

FIG. 3 is a graph illustrating a mapping of a test pattern onto the keyword, and the determination of a measure of similarity.

DESCRIPTION OF THE PREFERRED EMBODIMENTS

Figure 2:
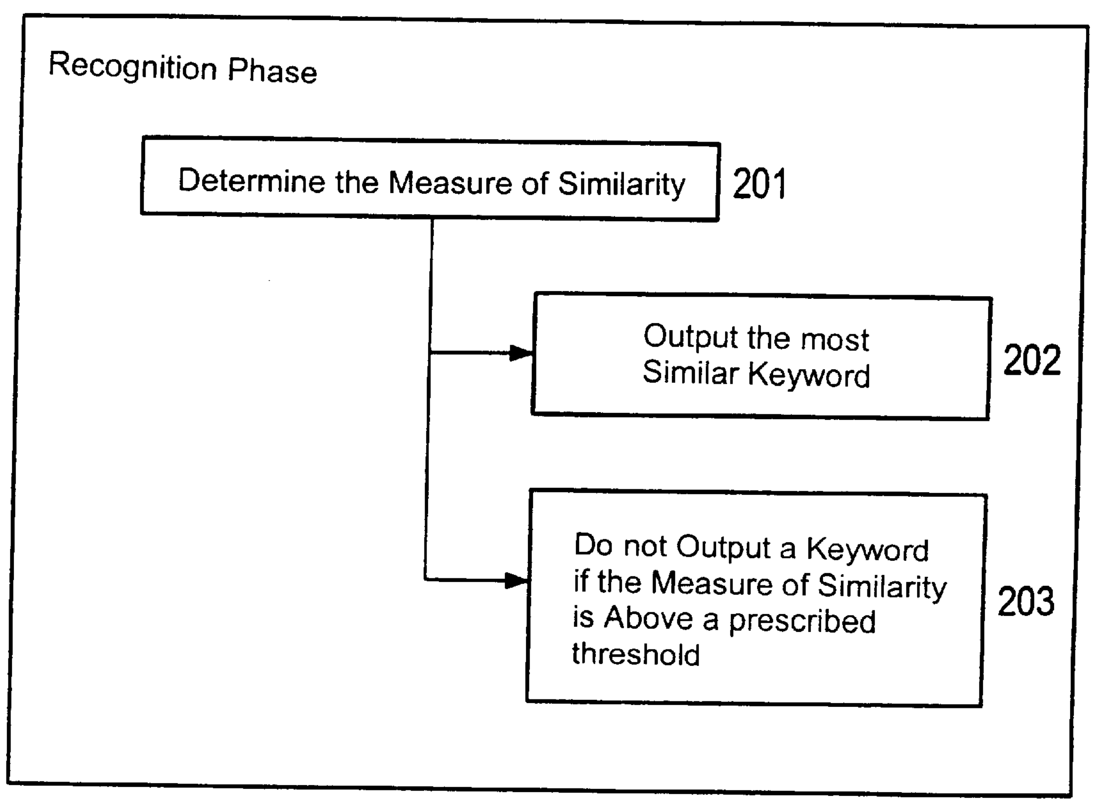
FIG. 2 is a flow block diagram of two possible exemplary embodiments for recognizing the keyword.

Spoken speech is preferably digitized every 10 ms in overlapping time windows of 25 ms duration, and preprocessed (filtered), if appropriate. Either a LPC analysis, a spectral analysis or a Cepstral analysis is applied for this purpose. A feature vector with n coefficients is available for each 10 ms section as a result of the preprocessing.

The individual components of the spoken speech—preferably words—are determined with the aid of the pauses which are determined between the words with the aid of a pause energy or a pause spectrum. An individual word is identified within the spoken speech in this way.

Two components, a training phase 101 and a recognition phase 102, are coarsely distinguished in FIG. 1. Both in the training phase 101 and in the recognition phase 102, the word determined, be it a keyword or a test pattern, is subdivided into a prescribed number of segments. The feature vectors of a segment are preferably averaged. A sequence of the segments with averaged feature vectors supplies a word pattern.

A word (keyword or test pattern) recognized in the spoken speech is subdivided in each case into a prescribed number of segments. The plurality of feature vectors within a segment are averaged, these averaged feature vectors as a whole representing the word (word pattern). One keyword is stored for later recognition, a plurality of representations of this keyword being stored, in particular. It has proved to be particularly useful to record the keyword of a plurality of speakers several times and in each case to store the best recordings describing the keyword. In this case, the best recordings are stored in the form of one averaged feature vector each per segment. This produces a prescribed number of reference features relating to the respective segment of the keyword. The reference features stored in this way can be used to compose the word from the sequence determined by the sequence of the segments to form different reference patterns. In this case, reference features of different representations of the keywords are composed to form a reference pattern. This produces a plurality of possibilities for reference patterns that were stored as original representatives of the keyword. In the recognition phase 102 following the training phase 101, the closest reference feature (relating to the segment) is respectively assigned to the corresponding segment of the test pattern.

The training phase 101 includes the step of subdividing the keyword into a prescribed number of segments, step 103. In step 104, $k_i$ reference features per segment i are stored, k representing the number of the representations determined for the keyword. A word class is represented in a step 105 by a sequence of reference features described by the sequence of the segments. The word class that describes the keyword with all stored variations is described by the various combinations of the reference features relative to reference patterns which represent reference pattern instances of the word class.

It is determined in the recognition phase 102 whether a word, here denoted as a test pattern, can be assigned to a keyword. For this purpose, the test pattern is segmented in accordance with the above discussion in a step 106. In a step 107, segments of the test pattern are mapped onto segments of the keyword, each segment of the test pattern being assigned respectively the most similar reference feature of the keyword. This assignment is carried out for all segments, measures of similarity calculated for each segment being accumulated to form an overall measure of similarity (see step 108). If the value of the accumulated measure of similarity is below a prescribed bound, this corresponds to a high degree of similarity between the test pattern and keyword, and the test pattern is recognized as a keyword (step 109).

The similarity is determined, in particular, with the aid of a distance or spacing. If two patterns are similar, they are at a slight distance from one another, the difference of the feature vectors being correspondingly slight. The measures of similarity determined for the respective segments therefore correspond to distances of feature vectors, which distances correspond, in turn, for a mapping error committed when mapping from segment to segment. The accumulation of the measures of similarity corresponds to the addition of mapping errors made segment by segment, and so the overall measure of similarity is a value for an error made overall when assigning the test pattern to the keyword. Since, in particular, more than one keyword is to be recognized, the test pattern is mapped onto a plurality of keywords, in which case measures of similarity are determined segment by segment in each case, and an accumulated measure of similarity is calculated for each assignment to each keyword. That keyword is recognized for which the accumulated overall measure of similarity exhibits the lowest value of all the assignments to the plurality of keywords.

FIG. 2 shows a sketch with two possible exemplary embodiments for recognizing the keyword. The determination, described in FIG. 1, of the measure of similarity for each keyword (see step 201) leads to the detection and/or the output of the most similar keyword (compare step 202 and description relating to FIG. 1). A second exemplary embodiment recognizes no word class and/or outputs no word class when the best accumulated measure of similarity, that is to say the smallest error in the mapping of the test pattern on the respective keywords, is above a prescribed threshold (see step 203). In such a case, an assignment, that is to say a mapping of the test pattern onto a keyword, would be so poor that it is to be assumed that the test pattern is not a keyword. No forced assignment to the best-fitting keyword, which is still poor and scarcely fits, is performed.

Shown in FIG. 3 is a sketch that illustrates the mapping of the test pattern onto the keyword and the determination of the measure of similarity.

By way of example, five segments $SG_iT$ (i=1,2, . . . ,5) of a test pattern TEM are mapped onto five segments $SG_iS$ of a reference pattern $RM_u$. The keyword (word class) to be recognized can be represented by different combinations of reference features $RM_i$, as determined by the sequence of the segments. As described above, the reference features are determined as particularly good representations of the segments of the keyword (training phase).

Initially, the first segment SG1T of the test pattern is assigned to the first segment SG1S of the keyword. In this case, a measure of similarity M11 is determined, the averaged feature vector describing the first segment SG1T of the test pattern TEM being mapped onto the most similar of the reference features RM1 and RM2. Thereafter, the second segment SG2T of the test pattern TEM is mapped onto a next reference feature of the keyword. Three different paths W1, W2 and W3 are possible in this case. The path W1 goes one segment to the right with the gradient 0, the path W2 goes one segment to the right with the gradient 1 and the path W3 goes one segment to the right with the gradient 2. The best measure of similarity is therefore determined. The second segment SG2T of the test pattern TEM is compared with the reference features RM1, RM2 (for path W1), RM3, RM4, RM5 (for path W2) and RM1, RM2 (for path W3), and the most similar one is determined. The procedure continues similarly in the case of the transition from the second to the third segment as well, depending on the path taken in the transition from the first to the second segment.

The reference features representing the keyword are, for example, the same for the first segment SG1S and the third segment SG3S, since the respective segments represent the same sounds. In order not to waste storage space unnecessarily, and in each case to store the reference features $RM_i$ repeatedly and individually for each keyword, a table is drawn up which contains the reference features (compare TABLE). Thus, only pointers to the memory area of the table TABLE are stored with the segments of the keyword, the pointers referring to the respective data of the reference features. The storage space requirement for a pointer (also offset within a table) is substantially lower than the data belonging to the respective reference feature.

Figure 4:
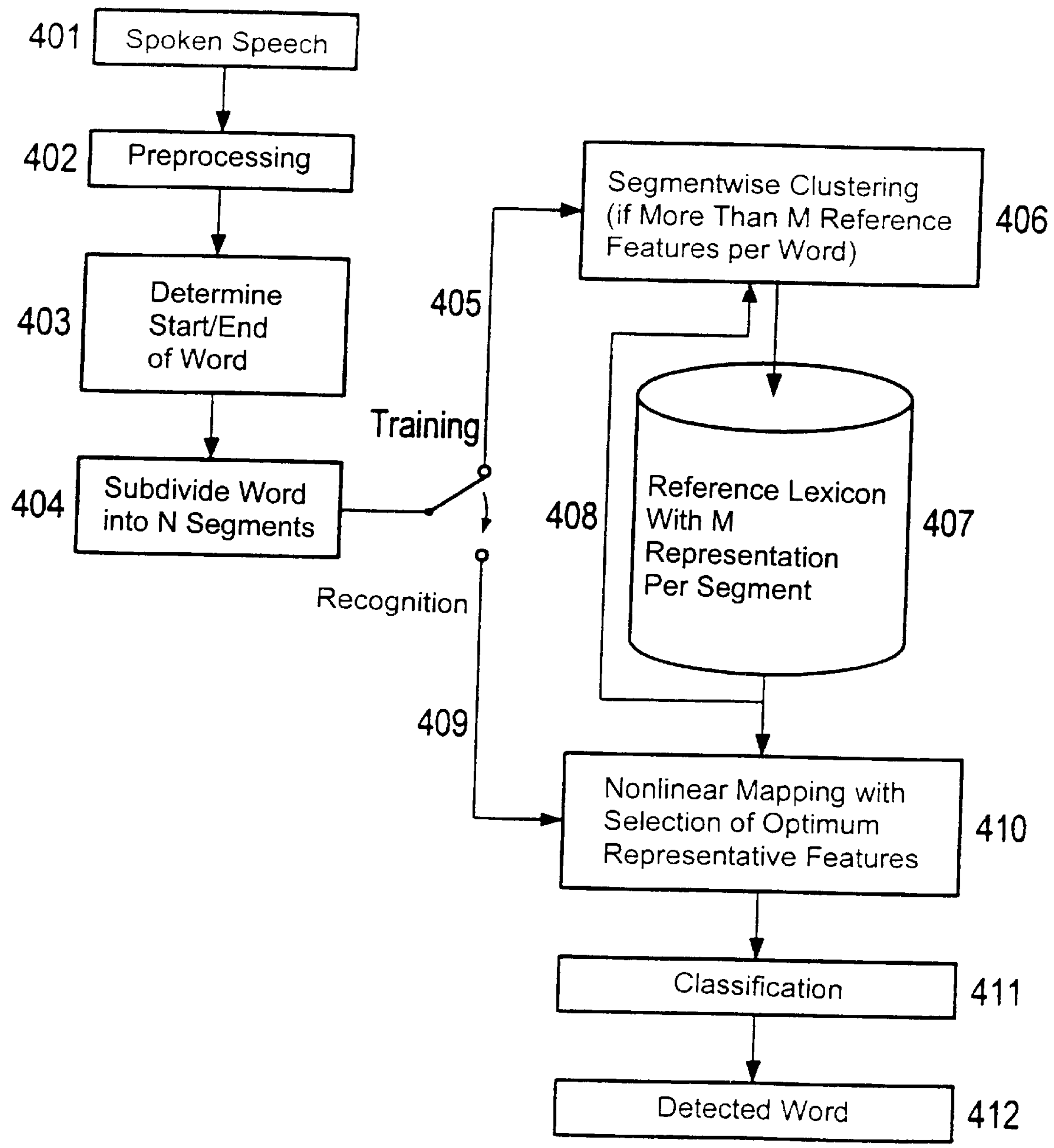
FIG. 4 is a block diagram of a device for recognizing the keyword in spoken speech.

FIG. 4 shows a device for speech recognition of at least one keyword. Feature vectors (see the reference by N. Haberland, et. al.) are determined from spoken speech 401 with the aid of preprocessing 402. Thereupon, the start of the word/end of the word is determined 403, and the identified word is subdivided into N segments (see block 404). The segments are stored in a step 406 in a database 407 during a training phase (determined by the connection 405), more than M representatives for a segment leading to averaging, in particular according to a sliding average, of the representatives in the database 407. For this purpose, the representatives of a segment are fed via a connection 408 to the averaging operation (also clustering). In a recognition phase (indicated by the connection 409), nonlinear mapping is undertaken with a selection of segments which are to be fitted optimally to a test pattern, a representative being determined for each segment from the database 407 (see block 410). Thereupon, classification is performed in a block 411 and the recognized word is output (see block 412).

I claim:

1. A speech recognition method, which comprises:

using a computer to perform the steps of:

- storing a keyword in a plurality of representations;
- subdividing the keyword into key segments;
- assigning each of the key segments a set of reference features of different representations;
- subdividing a test pattern derived for spoken speech into test segments;
- assigning each of the test segments of the test pattern a reference feature from the set of reference features of different representations being most similar to a respective test segment; and
- recognizing the test pattern as the keyword, if a measure of similarity is determined to be below a prescribed value of an accumulated segment-wise comparison of the reference feature to the respective test segment for each of the test segments of the test pattern.

2. The method according to claim 1, which comprises using an independent sound unit as the test pattern.

3. The method according to claim 1, which comprises setting a number of the keys segments equal to a number of the test segments.

4. The method according to claim 1, which comprises comparing the test pattern with a plurality of keywords, and outputting the keyword being most similar to the test pattern.

5. The method according to claim 1, which comprises using feature vectors for storing the spoken speech representing the keyword and the test pattern, respectively, in which case at prescribed sampling instants the keyword and the test pattern are digitized, respectively, and one of the feature vectors is stored with data characterizing the spoken speech.

6. The method according to claim 5, which comprises storing for each segment of the key segments and of the test segments, a feature vector which is averaged over all the feature vectors of the segment, the feature vector characterizes the segment.

7. The method according to claim 1, which comprises determining the prescribed value such that a best fit for the keyword is always recognized.

8. The method as claimed in claim 1, which comprises using a word as the test pattern.

9. A speech recognition device, comprising:

a processor unit programmed to:

store a keyword in a plurality of representations;

subdivide a said keyword into key segments;

assign each of said key segments a set of reference features of different representations;

subdivide a test pattern of spoken speech into test segments;

assign each of said test segments of said test pattern a reference feature from said set of reference features of different representations being most similar to a respective test segment; and recognize said test pattern as said keyword, if a measure of similarity is determined to be below a prescribed value of an accumulated segment-wise comparison of said reference feature to said test segment.

* * * * *